United States Patent
Sköld et al.

[19]

[11] Patent Number: 5,903,610
[45] Date of Patent: May 11, 1999

[54] METHOD AND APPARATUS FOR CHANNEL ESTIMATION

[75] Inventors: Johan Sköld, Åkersberga; Linus Ericsson, Täby; Per-Olof Eriksson, Kista, all of Sweden

[73] Assignee: Telefonaktiebolaget LM Ericsson, Stockholm, Sweden

[21] Appl. No.: 08/836,056

[22] PCT Filed: Oct. 27, 1995

[86] PCT No.: PCT/SE95/01275

§ 371 Date: Apr. 29, 1997

§ 102(e) Date: Apr. 29, 1997

[87] PCT Pub. No.: WO96/13910

PCT Pub. Date: May 9, 1996

[30] Foreign Application Priority Data

Oct. 31, 1994 [SE] Sweden .................................. 9403724

[51] Int. Cl.⁶ ........................................................ H04B 15/00
[52] U.S. Cl. ........................................... 375/285; 375/262
[58] Field of Search .................................... 375/285, 262, 375/229, 230, 241; 455/63

[56] References Cited

U.S. PATENT DOCUMENTS

| 5,164,961 | 11/1992 | Gudmundson . |
| 5,199,047 | 3/1993 | Koch . |
| 5,251,233 | 10/1993 | Labedz et al. . |
| 5,373,507 | 12/1994 | Sköld . |
| 5,465,276 | 11/1995 | Larsson et al. .......................... 375/346 |
| 5,533,067 | 7/1996 | Jamal et al. . |
| 5,581,580 | 12/1996 | Lindbom et al. . |
| 5,596,607 | 1/1997 | Larsson et al. . |
| 5,657,348 | 8/1997 | Ericsson et al. . |
| 5,754,599 | 5/1998 | Ling et al. .............................. 375/340 |

FOREIGN PATENT DOCUMENTS

| 535 403 | 4/1993 | European Pat. Off. . |
| 551 803 | 7/1993 | European Pat. Off. . |
| 592 294 | 4/1994 | European Pat. Off. . |
| WO91/10296 | 7/1991 | WIPO . |

OTHER PUBLICATIONS

G.D. Forney, Jr., "Maximum–Likelihood Sequence Estimation of Digital Sequence sin the Presence of Intersymbol Interference," IEEE Transactions on Information Theory, vol. IT–18, No. 3, pp. 363–378 (May 1972).

S. Haykin, *Adaptive Filter Theory*, Prentice–Hall, Englewood Cliffs, NJ, pp. 307–316 (1986).

S. U.H. Qrueshi, "Adaptive Equalization," Proceedings of the IEEE, vol. 73, No. 9, pp. 1349–1387 (Sep. 1985).

G. Ungerboeck, "Adaptive Maximum–Likelihood Receiver for Carrier–Modulated Data–Transmission Systems," IEEE Transactions on Communications, vol. COM–22, No. 5, pp. 624–636 (May 1974).

*Primary Examiner*—Stephen Chin
*Assistant Examiner*—Mohammad Ghayour
*Attorney, Agent, or Firm*—Burns, Doane, Swecker & Mathis, L.L.P.

[57] ABSTRACT

In a receiver of a digital radio communication system, a combined channel estimate is formed by averaging a long channel estimate with a short channel estimate.

15 Claims, 3 Drawing Sheets

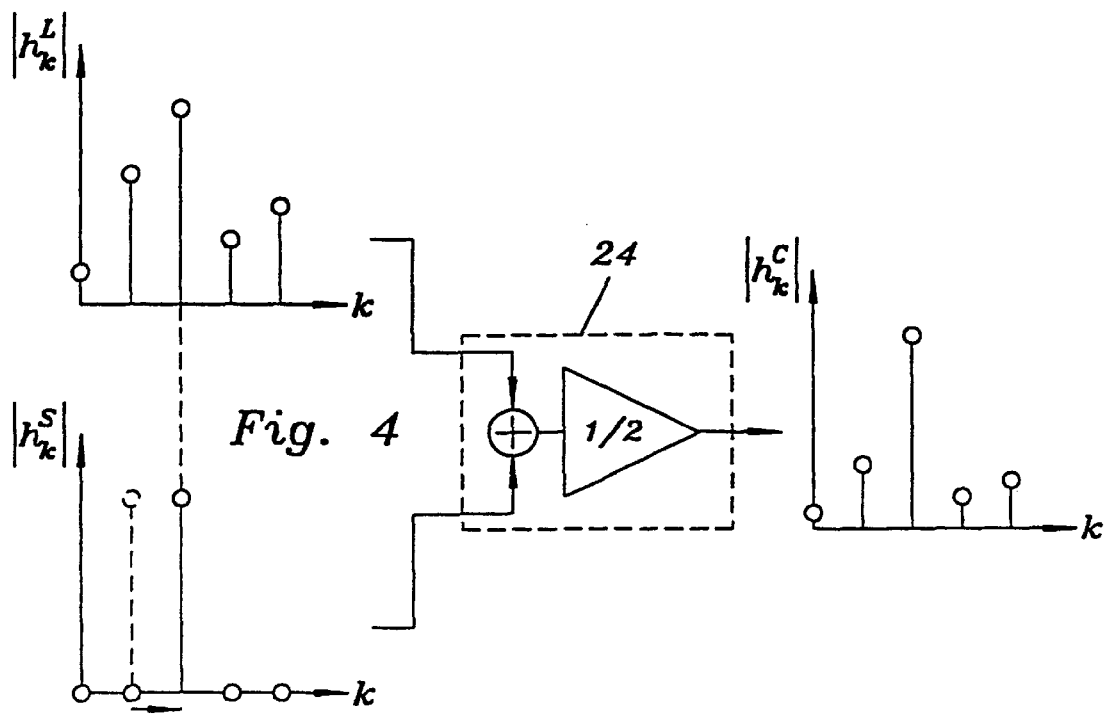
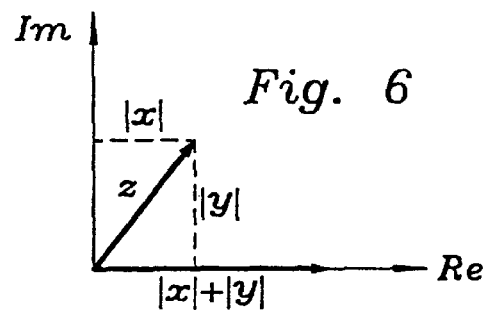
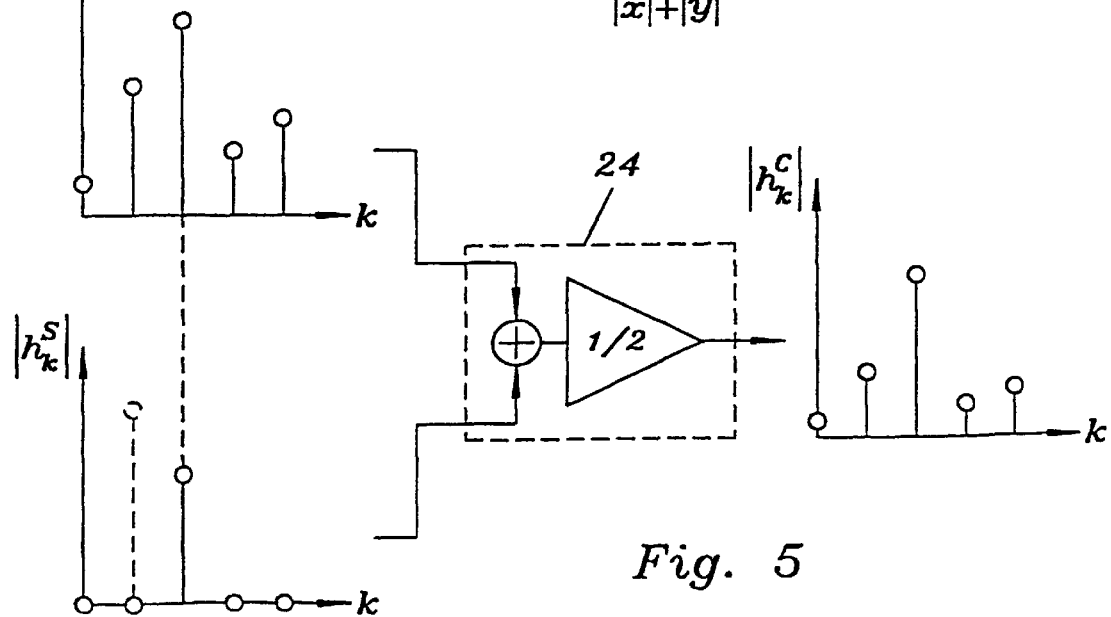

METHOD AND APPARATUS FOR CHANNEL ESTIMATION

TECHNICAL FIELD

The present invention relates to a method and apparatus for forming a channel estimate in a digital radio communication system.

BACKGROUND

In TDMA radio communication systems (TDMA=Time Division Multiple Access) and other frame based communication systems information is transmitted on a channel in the form of signal frames or bursts. In order to synchronize the receiver to these signal frames each signal frame comprises a known synchronization word in a predetermined position within each signal frame. In for instance the European GSM system for mobile telephony this synchronization word is 26 bits long. When the receiver expects a new signal frame from the transmitter, a training sequence that is identical to the transmitted synchronization word is generated by a training sequence generator in the receiver. The received signals are compared to the locally generated training sequence, and when the best possible correlation is obtained between this sequence and the received signals, synchronization is considered to exist between the locally generated and the received signal.

In addition to the synchronization itself the training sequence is also used for channel estimation. Since the radio channel often is subjected to multiple path propagation the receiver comprises some sort of equalizer to eliminate this phenomenon. The equalizer requires a time limited estimate of the impulse response of the channel. This impulse response can be obtained from the correlation signal. Forney [1] and Ungerboeck [2] describe two different algorithms that, given the channel impulse response and Gaussian channel noise with known correlation properties, determine the most likely sent sequence. Both algorithms will work properly, but with degraded performance, if an approximate estimate of the channel impulse response is used instead of the true impulse response, or if the noise is non-Gaussian. The equalizer makes use of the channel estimate to initialize and update e.g. filter taps. An example is the Maximum Likelihood Sequence Estimation (MLSE) detector, where an FIR-filter is used directly as a model of the channel [2]. Another example is decision feedback equalizers (DFE) [4], where the filter taps in both forward and feed-back are calculated from the channel estimate.

When the channel is estimated from a received synchronization word the estimate will contain noise, since the received data is noisy and the training sequence is of finite length. Even a channel estimate that is updated continuously will be noisy. The noise content in the channel estimate will be very high in e.g. fading dips, since the signal level in that case is low compared to the noise or interference level, giving a low signal-to-noise ratio in the received data. The synchronization process is also disturbed by receiver noise. An incorrect and unstable synchronization gives an incorrect channel estimate as a secondary effect, thereby causing a substantial loss in receiver performance. The noisy channel estimate gives incorrect settings for the filter taps in the detector or equalizer, e.g. the MLSE will have an incorrect FIR channel model. This causes degraded demodulation performance in a way similar to the degradation from noisy received samples. The effect is that the interference or noise in the received samples has a double impact—first the channel model is impaired, then the incorrectly set equalizer will have to equalize and demodulate noisy samples.

A common feature of the described prior art is that the channel estimate is used directly in the detection or equalization procedure without considering the noise content of the estimate. However, for example the MLSE is optimized in the sense that it gives the most likely demodulated symbol sequence only if the receiver noise is additive Gaussian and the channel estimate is exact. It is not optimal if there is noise in the channel estimate.

A method of reducing the influence of noisy taps in the channel estimate is proposed in U.S. Pat. No. 5,251,233 (Labedz et al). There it is suggested to delete taps in the channel estimate that are below a certain threshold value, thereby reducing the noise contribution from noisy taps with low content of useful signal. Totally eliminating some channel estimate taps may, however, remove vital information, since it is very difficult to distinguish between useful signal energy and noise energy in a tap.

EP-A-0 535 403 describes a method in which a channel estimate of a current burst is combined with a channel estimate of a previous burst. Both estimates have the same number of taps.

SUMMARY

Thus, an object of the present invention is to provide a method and apparatus for forming an improved channel estimate in a digital radio communication system.

The method of the invention is characterized by the features of claim 1.

The apparatus of the invention is characterized by the features of claim 9.

The present invention is based on the observation that a long channel estimate (an estimate having many taps) will contain more noise than a short estimate (having fewer taps). This is shown in the APPENDIX, where the tap noise is given by equation (9). In this equation N represents the total number of samples used in the calculation of the channel estimate and M represents the number of taps in the channel estimate. Increasing the number of taps M in the channel estimate will therefore also increase the tap noise. Furthermore, the total noise contribution in the demodulation process in the detector or equalizer is also proportional to the number of taps in the channel estimate. From this point of view it is therefore desirable to have a channel estimate that is as short as possible.

On the other hand, a short channel estimate may, in a case where there is much time dispersion, cause the receiver to exclude received energy outside of the span of the estimate, thereby disregarding important information present in the signal. The short channel estimate does, however, include the part of the signal with most of the energy content.

The solution to this problem is, according to the present invention, to combine one long channel estimate with at least one shorter channel estimate. This combines the properties of both:

1. It contains reliable (not so noisy) information on the part of the received signal that has most of the energy.
2. It also contains information on the signal spread caused by time dispersion over a larger time interval.

BRIEF DESCRIPTION OF THE DRAWINGS

The invention, together with further objects and advantages thereof, may best be understood by making reference to the following description taken together with the accompanying drawings, in which:

FIG. 4 illustrates how channel estimates are combined in another embodiment in accordance with the present invention;

FIG. 5 illustrates how channel estimates are combined in a further embodiment in accordance with the present invention; and FIG. 6 illustrates a simplified calculation of the amplitude of a complex number, which may be used in a preferred embodiment of the invention.

DETAILED DESCRIPTION

The apparatus and method of the present invention will now be described with reference to FIGS. 1 and 2.

Figure 1:
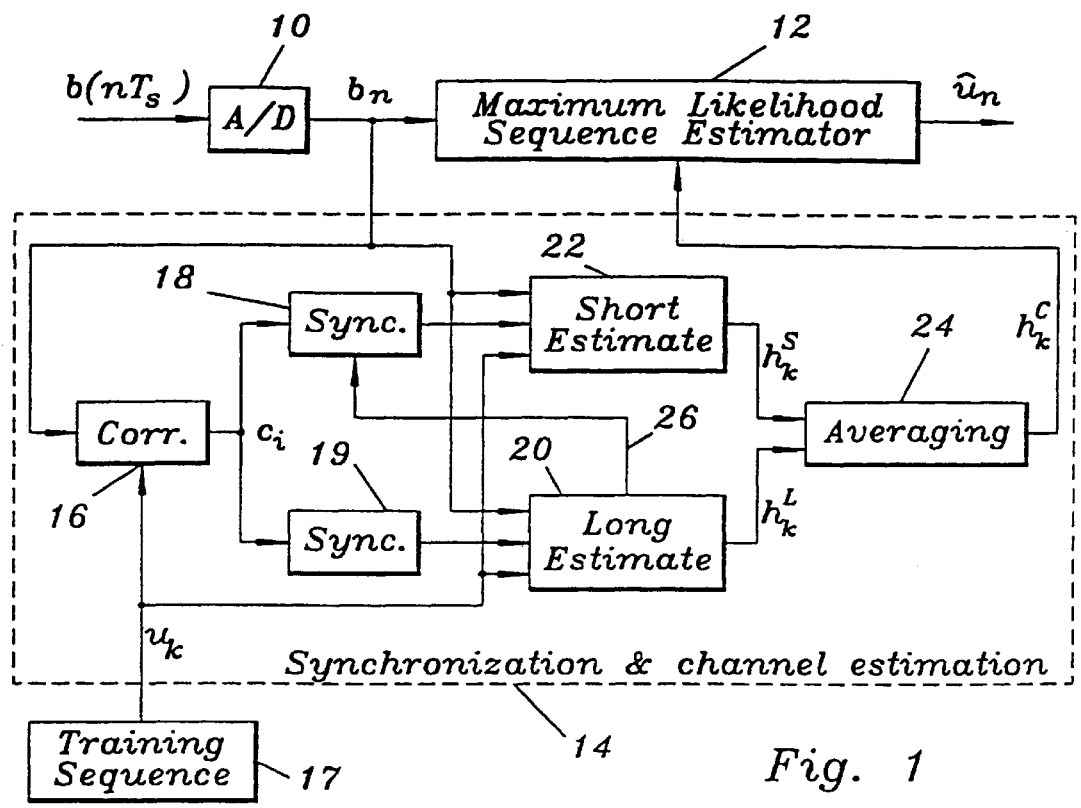
FIG. 1 is a block diagram of an apparatus in accordance with the present invention.

In FIG. 1 an A/D-converter receives analog samples $b(nT_s)$ and converts these samples to a sequence of digital samples $b_n$. These digital samples $b_n$ are forwarded to a Maximum Likelihood Sequence Estimator 12, which outputs a sequence of detected symbols $\hat{u}_n$. The digital sequence $b_n$ is also forwarded to a correlator 16 that correlates sequence $b_n$ with a locally generated training sequence $u_k$ received from training sequence generator 17. The correlation values $c_i$ from correlator 16 are used to synchronize the burst (step 110 in FIG. 2). This synchronization step will be further described below.

Methods for burst synchronization will be described below with reference to the European GSM-system. In this system a synchronization word comprises 26 bits. The 16 central bits in this word have good correlation properties when correlated with the entire synchronization word, that is a maximum correlation=16 in the central position and a correlation of 0 in the remaining ten positions (C(k)=[0 0 0 0 0 16 0 0 0 0 0]). These 16 central bits are generated as a training sequence in a training sequence generator in the receiver. This training sequence is used for forming for instance 11 correlation values $c_i$ with the received signal frame. According to one burst synchronization method the final synchronization position is chosen by comparing mutually displaced windows, each containing 5 correlation values, with respect to energy contents, and choosing the time position of the window with maximum energy as the synchronization position. Another burst synchronization method is described in EP-A-0 551 803.

Since two channel estimates will be combined, burst synchronization is performed for both the short and the long estimate. The synchronization step is performed in synchronizers 18 and 19, respectively. (Since the estimates are of different length they will not necessarily synchronize to the same burst position.)

The synchronization positions are forwarded to channel estimators 20, 22 for the long and short channel estimate, respectively. These estimators calculate channel estimates around the respective synchronization positions, as will be further described below.

In the APPENDIX it has been shown that the tap noise may be estimated in accordance with formula (9). This formula indicates that the tap noise will be reduced by using as many samples $b_n$ as possible (increasing N). For this reason the long estimate $h_k^L$ is recalculated by using as many of the 26 samples of the training sequence $u_k$ as possible and the received synchronization word $b_n$. Thus, channel estimator 20 will calculate five correlation values (in GSM) from N−M+1=26−5+1=22 samples (all 26 samples are actually used since 5 correlation values each based on 22 samples and shifted one sample are formed). These calculations are performed in the same way as in correlator 16, but since we now know the synchronization position the entire training sequence may be used to form the five taps of the long channel estimate $h_k^L$. The described procedure corresponds to step 120 in FIG. 2.

The short channel estimate $h_k^S$ is formed in a similar way in channel estimator 22. However, in this case fewer than five taps have to be calculated (M<5). In a preferred embodiment of the present invention the short channel estimate only comprises one tap, which means that N−M+1=26−1+1=26 samples may be used for channel estimation. Thus, in this case the entire training sequence is used to form a single correlation value with a significantly reduced tap noise. The described procedure corresponds to step 130 in FIG. 2.

Figure 3:
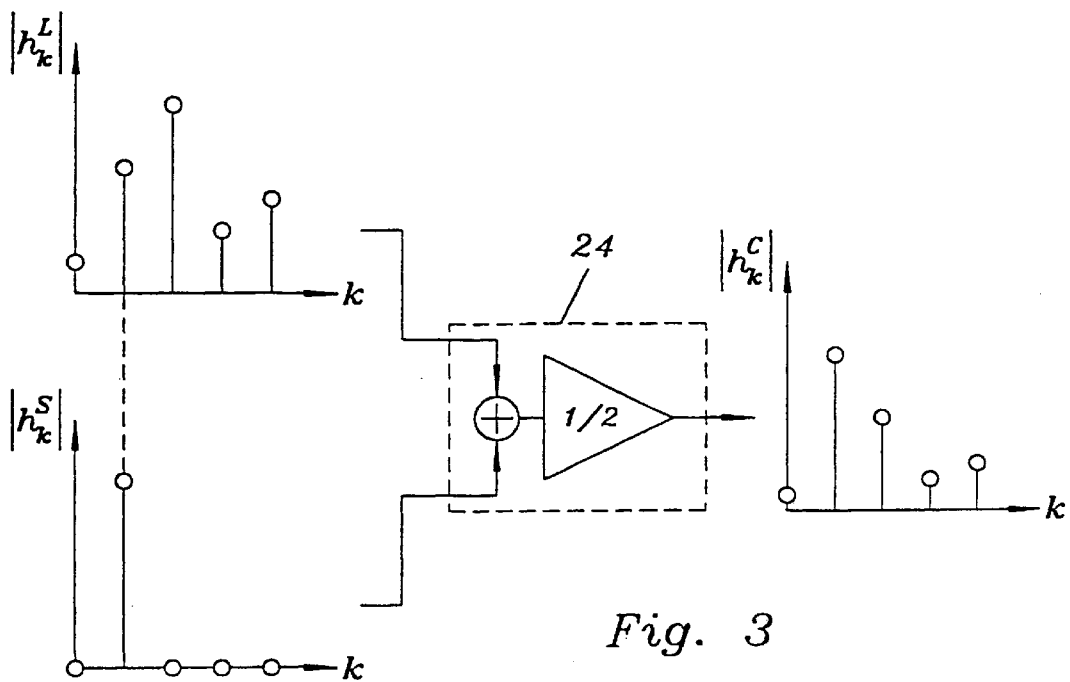
FIG. 3 illustrates how channel estimates are combined in one embodiment of the present invention.
Figure 2:
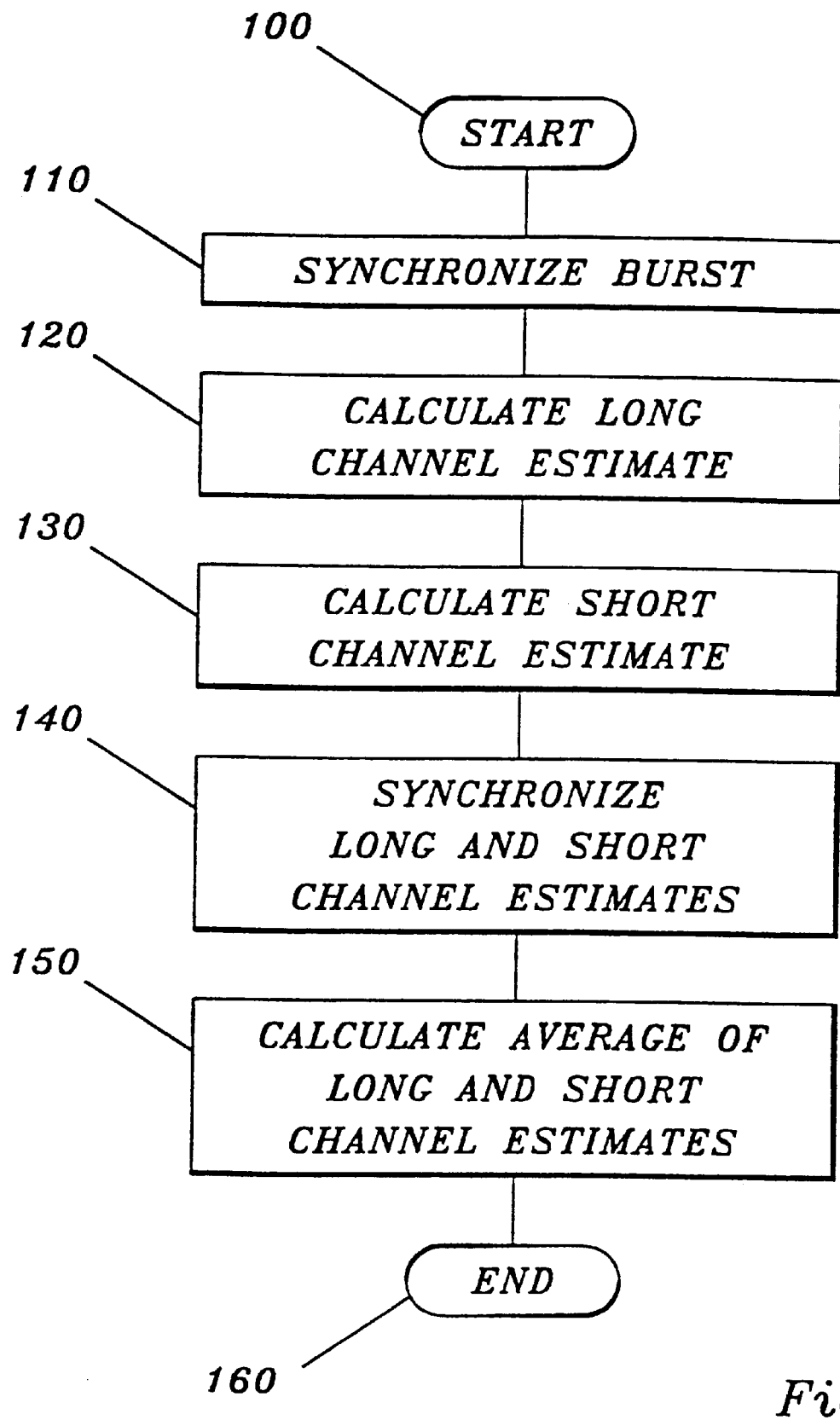
FIG. 2 is a flow chart illustrating the method in accordance with the present invention.

The calculated channel estimates $h_k^L$ and $h_k^S$ are combined in an averaging circuit 24 (corresponds to step 150 in FIG. 2). An example of this averaging process is illustrated in FIG. 3 (to simplify the illustration only the amplitudes of the estimates are shown). In this embodiment the estimates are combined with their original burst synchronization (since the illustrated short estimate only has one tap it is assumed to have taps with zero values in all other time positions). This may result in a situation where the maximum values of the two estimates are not in the same time position, as indicated in FIG. 3.

Since the short and long channel estimates have been separately synchronized with the burst, it may be preferable to first mutually synchronize the calculated channel estimates. This is indicated by line 26 in FIG. 1, where channel estimator 20 informs synchronizer 18 of the proper synchronization position to be used for the short channel estimate. This corresponds to step 140 in FIG. 2.

There are different ways to obtain mutual synchronization between the short and long channel estimates. One method is illustrated by FIG. 4. According to this method the maximum tap of the short estimate $h_k^S$ is synchronized with the position of the maximum tap of the long estimate $h_k^L$. This embodiment implies that the taps of the short estimate may be shifted, as indicated by the dashed tap in FIG. 4. This dashed tap represents the burst synchronization position of the short estimate. The tap will be recalculated in estimator 22 and then shifted to the position of the solid line tap estimate $h_k^S$ in FIG. 4. This estimate synchronization is reasonable, since the maximum taps of the long and short estimates usually will have coinciding positions.

Another mutual channel estimate synchronization method is illustrated in FIG. 5. Here the burst synchronization position of the short estimate (containing only one tap in the example) $h_k^S$ is indicated by the dashed tap. However, this tap will not be recalculated. Instead the tap that corresponds to the position of the maximum tap of the long estimate $h_k^L$ will be recalculated and averaged with the maximum tap of the long estimate. As in the previous embodiment this estimate synchronization is reasonable, since the maximum taps of the long and short estimates usually will have coinciding positions.

After mutual synchronization of the short channel estimate $h_k^S$ and the long channel estimate $h_k^L$ these estimates are combined in an averaging circuit 24. In a simple, presently preferred embodiment, this averaging circuit 24 performs simple averaging of corresponding taps of the long and short estimates, as illustrated in FIGS. 3, 4 and 5. In a more elaborate embodiment a weighted average may be formed by calculating weighting factors from reliability measures (noise measures) for each of the two channel estimates. The combined channel estimate $h_k^C$ is forwarded to maximum likelihood sequence estimator 12 for adjusting the filter coefficients thereof.

In case the short channel estimate contains only one tap, the above described process may be simplified by noting that the maximum correlation value $c_i$ may be used directly to represent this tap. Thus, if a reduction of calculation complexity is desired, it may be sufficient to provide the maximum value of $c_i$ as the short estimate (no recalculation of the short estimate). In such an embodiment the burst synchronization position of this estimate may be used as a reference position for the largest tap of the long estimate.

In a more elaborate embodiment the energy of the maximum tap of the long estimate is compared to the total energy of the long estimate. If the maximum tap is very dominating this indicates that there is very little time dispersion. In this case a single tap model of the channel is a very good model and the single tap short estimate is recalculated using the entire training sequence. On the other hand, if the time dispersion is large the channel estimate will be spread out and the maximum tap will not be dominating. In this case a single tap model is not so good and there is not much to gain by recalculating this tap by using the entire training sequence. Thus, in this case the single tap from the burst synchronization is used as the short estimate.

Another simplification that may be performed is to consider only the amplitude of the short estimate and disregard its phase (in case the short estimate contains only one tap). This non-coherent combination does not imply a significant loss in performance, since the phase of the two largest taps of both estimates usually are close to each other.

A further simplification may be performed by calculating the amplitude of the short estimate by adding the absolute values of its real and imaginary parts, respectively, as illustrated in FIG. 6. In this approximation z is approximated by $|x|+|y|$, where x and y are the real and imaginary part, respectively. In the illustrated embodiments two channel estimates have been combined. However, it is obvious that it is possible to combine more than two estimates. Thus, a feasible embodiment would be a combination of three channel estimates of different lengths. It is also appreciated that the present invention is applicable to other systems than the described GSM system.

The methods described above are simple ways to improve receiver performance without dramatic increase in complexity. The improvement in receiver performance is approximately 1 dB for some propagation conditions in the GSM case.

It will be understood by those skilled in the art that various modifications and changes may be made to the present invention without departure from the spirit and scope thereof, which is defined by the appended claims.

CITATIONS

[1] G. D. Forney, Jr., "Maximum-Likelihood Sequence Estimation of Digital Sequences in the Presence of Intersymbol Interference", Vol. IT-18, pp. 363–378, May 1972.

[2] Gottfried Ungerboeck, "Adaptive Maximum-Likelihood Receiver for Carrier-Modulated Data-Transmission System", IEEE Trans. on Communications, Vol. COM-22, pp. 624–636, May 1974.

[3] Simon Haykin, "Adaptive Filter Theory", pp. 307–316, Prentice-Hall, Englewood Cliffs, N.J., 1986.

[4] S. U. H. Quereshi, "Adaptive Equalization", Proc. IEEE, Vol. 73, pp. 1349–1387, September 1985.

APPENDIX

Least squares estimation of the channel

The model used for the channel is a FIR filter with filter taps $\{h_k\}$ modelling the propagation and an additive white Gaussian noise (AWGN) source $e_i$ modelling the noise. It is similar to Haykin's linear regression model (Simon Haykin, "Adaptive Filter Theory", Prentice-Hall, 1986, pp 307–316). The expression for the received discrete signal samples $b_i$ is:

$$b_i = \sum_{k=0}^{M-1} h_k u_{i-k} + e_i \tag{1}$$

where $u_i$ is the input signal to the channel and M is the length of the channel estimate (filter taps $\{h_k\}$). Thus, the radio channel impulse response is limited to M samples of $h_k$. In GSM for example M=5. The impulse response is an unknown parameter estimated from the training sequence. In the GSM example the training sequence is N=26 symbols long. A least squares method (see Haykin [3]) is used to estimate the M tap model (5 taps in GSM). The input data from the training sequence is windowed using the covariance method. Thus, there are N−M+1 (22 in GSM) received samples to use for estimation. The input is arranged as a matrix A and the received samples b, error e and impulse response h are arranged as vectors as follows:

$$A = \begin{pmatrix} u_{M-1} & u_M & \ldots & u_{N-1} \\ u_{M-2} & u_{M-1} & \ldots & u_{N-2} \\ \ldots & \ldots & \ldots & \ldots \\ u_0 & u_1 & \ldots & u_{N-M} \end{pmatrix} \tag{2}$$

$$b = [b_0 \; b_1 \; \ldots \; b_{N-M}]^T \tag{3}$$

$$e = [e_0 \; e_1 \; \ldots \; e_{N-M}]^T \tag{4}$$

$$h = [h_0 \; h_1 \; \ldots \; h_{M-1}]^T \tag{5}$$

where T represents transpose. In vector form the channel model may be expressed (for the training sequence) as:

$$b = Ah + e \tag{6}$$

The least squares estimate $\hat{h}$ of h is (see Haykin)

$$\hat{h} = (A^H A)^{-1} A^H b = 10 I^{-1} A^H b \tag{7}$$

where $\Phi = A^H A$ is the deterministic correlation matrix of the training sequence. Here H represents Hermitean transpose.

The variance of each element of the channel estimate $h_i$ is called $N_i$, and depends on the noise variance $\sigma^2$ and on the training sequence used. $N_i$ is the ith diagonal element of $\sigma^2 \Phi^{-1}$, where $\Phi$ is the deterministic correlation matrix defined above.

If the training sequence is close to white (which is the case in e.g. GSM), the correlation matrix will be:

$$\Phi \approx (N - M + 1)I \Rightarrow \Phi^{-1} \approx \frac{1}{N - M + 1} I \tag{8}$$

where I is the identity matrix. The conclusion is that the tap noise is:

$$N_i \approx \frac{\sigma^2}{N - M + 1} \tag{9}$$

What is claimed is:

1. A method of forming a channel estimate in a digital radio communication system, comprising the steps of:

forming, from a received training sequence, a first channel estimate having a predetermined number of taps;

forming, from the same received training sequence, at least one further channel estimate having fewer taps than said first channel estimate; and combining said first and said further channel estimate for forming a combined channel estimate.

2. The method of claim 1, further comprising the step of averaging corresponding taps of said first and said further channel estimates, said further channel estimate(s) being padded with zero values in tap positions that correspond to taps of said first channel estimate that have no correspondence in said further channel estimate(s).

3. The method of claim 2, further comprising the step of considering only tap amplitude and disregarding tap phase of taps of said further channel estimate(s) in said averaging.

4. The method of claim 3, further comprising the step of approximating the amplitude of each tap of said further channel estimate(s) with the sum of the amplitudes of its real and imaginary parts, respectively.

5. The method of claim 2, wherein a single further channel estimate having a single tap is formed.

6. The method of claim 5, wherein said single tap of said further channel estimate is averaged with a tap of maximum amplitude in said first channel estimate.

7. The method of claim 5, comprising the step of averaging a tap of maximum amplitude of said first channel estimate with the single tap of said further channel estimate, as estimated in the same time position.

8. The method of claim 2, comprising the steps of weighted averaging of said first and said further channel estimates.

9. An apparatus for forming a channel estimate in a digital radio communication system, comprising:

first means for forming, from a received training sequence, a first channel estimate having a first predetermined number of taps;

second means for forming, from the same received training sequence, at least one further channel estimate having fewer taps than said first channel estimate; and means for combining said first and said further channel estimate for forming a combined channel estimate.

10. The apparatus of claim 9, further comprising averaging means for averaging corresponding taps of said first and said further channel estimate(s), said further channel estimate(s) being padded with zero values in tap positions that correspond to taps of said first channel estimate that have no correspondence in said further channel estimate(s).

11. The apparatus of claim 10, wherein said averaging means considers only tap amplitude and disregarding tap phase of taps of said further channel estimate(s) in said averaging.

12. The apparatus of claim 11, wherein said averaging means approximates the amplitude of each tap of said further channel estimate(s) with the sum of the amplitudes of its real and imaginary parts, respectively.

13. The apparatus of claim 10, wherein the second means forms a single further channel estimate having a single tap.

14. The apparatus of claim 13, wherein said first means synchronizes said single tap of said further channel estimate with a tap of maximum amplitude in said first channel estimate.

15. The apparatus of claim 13, wherein said first means synchronizes a tap of maximum amplitude of said first channel estimate with the single tap of said further channel estimate, as estimated in the same time position.

* * * * *